United States Patent [19]

Sumino et al.

[11] Patent Number: 5,284,925
[45] Date of Patent: Feb. 8, 1994

[54] METHOD OF POLYMERIZING VINYL MONOMERS WITH USE OF A DEPOSIT SUPPRESSANT COMPOSITION FOR THE INTERNAL SURFACES OF A POLYMERIZATION REACTOR

[75] Inventors: Takeshi Sumino; Tetsuyoshi Yano, both of Niihama, Japan

[73] Assignee: Sumitomo Chemical Company, Limited, Osaka, Japan

[21] Appl. No.: 980,175

[22] Filed: Nov. 23, 1992

[30] Foreign Application Priority Data

Dec. 2, 1991 [JP] Japan ................................. 3-317619

[51] Int. Cl.$^5$ ............................................ C08F 14/06
[52] U.S. Cl. ..................................... 526/62; 526/204; 526/234; 526/344
[58] Field of Search .................. 526/62, 204, 234, 344

[56] References Cited

U.S. PATENT DOCUMENTS

| | | | |
|---|---|---|---|
| 4,431,783 | 2/1984 | Walker et al. | 526/62 |
| 4,555,555 | 11/1985 | Toyooka et al. | 526/62 |

FOREIGN PATENT DOCUMENTS

| | | |
|---|---|---|
| 27466 | 4/1981 | European Pat. Off. . |
| 45-30343 | 10/1970 | Japan . |
| 132907 | 6/1987 | Japan . |
| 3705 | 1/1991 | Japan . |

Primary Examiner—Joseph L. Schofer
Assistant Examiner—Tom Weber
Attorney, Agent, or Firm—Birch, Stewart, Kolasch & Birch

[57] ABSTRACT

Disclosed is a method of polymerizing a vinyl monomer wherein prior to the polymerization, a deposit suppressant composition comprising an 8-hydroxyquinoline sulfide compound is applied to the internal surfaces of a polymerization reactor.

20 Claims, No Drawings

METHOD OF POLYMERIZING VINYL MONOMERS WITH USE OF A DEPOSIT SUPPRESSANT COMPOSITION FOR THE INTERNAL SURFACES OF A POLYMERIZATION REACTOR

FIELD OF THE INVENTION

The present invention relates to a method of polymerizing vinyl monomers with use of a deposit suppressant composition for the internal surfaces of a polymerization reactor for polymerizing vinyl monomers.

PRIOR ART

A problem associated with the polymerization of vinyl monomers is the progressive deposit on the internal surfaces of the polymerization reactor, more specifically on the internal wall of the reactor and the surfaces of the impeller, baffles and so on.

The deposit on the internal surface of a polymerization reactor not only detracts from the reactor cooling efficiency but, upon detachment and entry of the deposit into product polymers, adversely affects the quality of the product polymers. Furthermore, much labor and time are required for removal of the deposit. Therefore, not a few methods of coating the internal surfaces of a polymerization reactor with a deposit suppressant have heretofore been proposed.

For example, Japanese Examined Patent Publication (Kokoku) No. 30343/1970 teaches the use of polar organic compounds such as thioethers. Japanese Examined Patent Publication No. 363/1990 discloses condensates of phenolic compounds with formaldehyde or benzaldehyde. Japanese Unexamined Patent Publication (Kokai) No. 34241/1989 (EP0027466) discloses a reaction product of a thiodiphenol and a bleaching agent. U.S. Pat. No. 4,555,555 describes condensates of pyrogallol or hydroxyhydroquinone with aromatic aldehydes. U.S. Pat. No. 4,431,783 teaches a 1-naphthol-formaldehyde condensate. Japanese Unexamined Patent Publication (Kokai) No. 132907/1987 teaches polysulfide rubbers.

However, some of these proposed deposit suppressants tend to reduce the polymerization rate or detract from the quality of the product polymers, while others are not sufficient in the suppressant effect or only effective for a limited time. Thus, all of these methods remain to be improved.

SUMMARY OF THE INVENTION

The present invention provides a method of polymerizing a vinyl monomer wherein the vinyl monomer is polymerized using a deposit suppressant composition to prevent the formation of deposit on the internal surfaces of a polymerization reactor, the method being characterized in that the deposit suppressant composition which comprises an 8-hydroxyquinoline sulfide compound is applied to the internal surfaces of the polymerization reactor prior to the polymerization.

DETAILED DESCRIPTION OF THE INVENTION

The 8-hydroxyquinoline constituting the 8-hydroxyquinoline sulfide compound of the invention is represented by the following formula

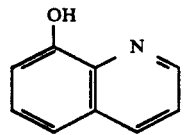

and is also termed 8-quinolinol

The 8-hydroxyquinoline sulfide compound used in the present invention is already known and described in Japanese Examined Patent Publication (KOKOKU) No. 3705/1991 as a rubber modifier which gives vulcanized rubbers not only excellent mechanical strength such as modulus and resilience but also suppressed blooming and suppressed heat build-up properties. However, it has not been known that the 8-hydroxyquinoline sulfide compound is effective for suppressing deposit on the internal surfaces of a polymerization reactor for polymerizing vinyl monomers.

The 8-hydroxyquinoline sulfide compound can be prepared by various methods, for example, by reacting 8-hydroxyquinoline with a sulfur chloride or sulfur.

First, a process for preparing the 8-hydroxyquinoline sulfide compound by reacting 8-hydroxyquinoline with a sulfur chloride is described below. In this reaction, 8-hydroxyquinoline and a sulfur chloride such as sulfur monochloride or sulfur dichloride are subjected to a condensation reaction.

For this reaction, 8-hydroxyquinoline is first dissolved in an organic solvent inert to sulfur chloride. The organic solvent includes aromatic hydrocarbons such as toluene, xylene, chlorobenzene, etc., ethylene dichloride, chloroform, ethyl acetate and so on. Then, sulfur chloride is slowly added to the solution with heating and stirring.

The amount of sulfur chloride to be used is about 0.5 to 2 moles, preferably about 0.9 to 1.2 moles, per mole of 8-hydroxyquinoline.

The reaction temperature may range from about 50° C. to 150° C. and the reaction time may generally range from about 0.5 to about 10 hours.

When the reaction is conducted in an open system under atmospheric pressure, the byproduct hydrogen chloride formed with the progress of the reaction may be let off. If the reaction is conducted in a closed system, a suitable hydrochloric acid acceptor such as triethylamine can be employed, if so desired.

After completion of the reaction, the reaction product, if present in solution, can be recovered by evaporating the solvent. If the reaction product has precipitated out in the reaction mixture, it can be isolated by a solid-liquid separation technique, such as filtration.

An alternative process for production of the 8-hydroxyquinoline sulfide compound by reacting 8-hydroxyquinoline with sulfur is as follows. First, 8-hydroxyquinoline and a small amount of caustic alkali, e.g. NaOH or KOH, are heated to give a melt. About 0.05 to 0.1 mole of the caustic alkali per mole of 8-hydroxyquinoline is preferably used. To this melt is gradually added sulfur powder. About 0.1 to 1.2 moles of the sulfur powder per mole of 8-hydroxyquinoline is preferably used. The temperature is then raised to about 150° to 200° C. The reaction is conducted with the byproduct hydrogen sulfide being constantly removed from the system under atmospheric pressure for about 2 to 10 hours. The reaction mixture is cooled to room temperature and then dissolved in an organic solvent to be mentioned below. From this solution, the insoluble matter is filtered off, and the filtrate is neutralized with a dilute acid such as a dilute sulfuric acid or a dilute hydrochloric acid, and the aqueous layer is discarded to obtain the desired product in the form of a solution.

For use as a deposit suppressant composition for the internal surfaces of a polymerization reactor, the sulfide compound is usually used as dissolved in a solvents, i.e., in the form of a solution for coating the internal surfaces of the reactor.

The solvent mentioned above is preferably a solvent that is capable of dissolving the sulfide compound and can be easily evaporated. Examples of such solvents include various organic solvents such as lower alcohols, particularly $C_1$-$C_4$ saturated aliphatic alcohols, e.g., methanol, ethanol etc.; ketones, particularly di($C_1$-$C_4$ alkyl) ketones, e.g. acetone, methyl ethyl ketone, methyl isobutyl ketone, etc.; esters of $C_1$-$C_3$ fatty acids with $C_1$-$C_4$ saturated aliphatic alcohols, e.g. ethyl acetate, etc. as well as aqueous alkali solutions. These organic solvent may be used singly or at least two of them may be used in admixture. Preferable aqueous alkali solutions are, for example, aqueous solutions of alkali metal hydroxide such as NaOH or KOH, and the preferred concentrations of such aqueous solutions are about 1 to 10% by weight.

The concentration of the sulfide compound in the deposit suppressant solution is not critical so far as the solution is suited for coating purposes, and generally may range from about 0.001 to about 50 g, preferably about 0.05 to about 5 g, per 100 ml of the solvent.

The use of such a solution of the sulfide compound as a deposit suppressant composition involves no further step than coating the internal surfaces of the polymerization reactor with the solution.

The term "internal surfaces of a polymerization reactor" used herein is intended to mean all the surfaces that will come into contact with charged monomers, such as the internal surfaces of the reactor body, the surfaces of impeller shaft, blades, baffles, etc. and the inner surfaces of the reflux condenser, conduits and so on. The material or materials constituting such internal surfaces need not be extraordinary but may be any of the industrially conventional materials such as stainless steel, glass, etc.

The method of applying the deposit suppressant solution to the internal surfaces of a polymerization reactor is not critical only if the surfaces can be adequately coated. Well-known methods can be used, such as brush-coating, spray-coating or filling the reactor with the solution and withdrawing the solution. For commercial large-scale operation, any of the known automatic coating methods as described in Japanese Unexamined Patent Publications No. 61001/1982, No. 36288/1980 and Japanese Examined Patent Publication No. 11303/1984, for instance, can be utilized.

The deposit suppressant composition is applied to the internal wall and other parts of a polymerization reactor which will come into contact with charged monomers in an amount of about 0.01 to 10 g/m$^2$ calculated as solids. If the amount is less than 0.01 g/m$^2$, the deposit suppressant effect will be inadequate and will not last long. The use of the composition in an amount of more than 10 g/m$^2$ will not achieve further remarkable improvement in the desired effect.

The above coating of internal surfaces of the polymerization reactor with the deposit suppressant composition of the invention is performed prior to polymerization of vinyl monomers. In the batch polymerization process, the coating operation can be carried out before every batch reaction but since the deposit suppressant effect of the composition is remarkable, several batch reactions can be consecutively conducted after each coating operation and, after checking for the degree of deposit, another coating procedure can be carried out.

In the case of continuous polymerization, the optimal next coating time can be determined by monitoring the degree of the deposit, for example, from heat exchange efficiency.

The polymerization methods to which the deposit suppressant composition of the invention can be applied are suspension polymerization, emulsion polymerization, microsuspension polymerization, solution polymerization, bulk polymerization, gas-phase polymerization and so on, all of which are well known. The effect of the invention is particularly remarkable in suspension, emulsion or microsuspension polymerization in an aqueous medium.

Typical vinyl monomers which can preferably be polymerized in accordance with the invention are vinyl halides such as vinyl chloride; vinyl esters such as vinyl acetate, vinyl propionate, etc., alkyl (meth)acrylates such as methyl methacrylate; esters, particularly lower alkyl esters of unsaturated dibasic acids such as maleic acid, fumaric acid, etc.; diene monomers such as butadiene, chloroprene, isoprene, etc.; styrene, acrylonitrile, vinylidene halides, vinyl ethers and so on.

These monomers can be used alone or in combination where copolymerizable, and may also be used in combination with, inter alia, acrylic acid, methacrylic acid, maleic acid or fumaric acid or the corresponding anhydrides thereof, itaconic acid, acrylamide, methacrylamide, dimethylaminoethyl methacrylate, N-methylolacrylamide, N-methylolmethacrylamide, 2-hydroxyethyl methacrylate, 2-hydroxypropyl acrylate, acrolein, $C_2$-$C_9$ olefins such as ethylene, propylene, and so on.

The deposit suppressant composition of the invention is particularly suited for the suppression of deposit formation in polymerizing vinyl chloride or a vinyl monomer mixture containing vinyl chloride as a major component and other monomer(s) copolymerizable therewith as a minor component. Such mixture preferably contains at least 50 wt %, preferably more than 80 wt % but less than 100 wt %, of vinyl chloride. Examples of other monomers copolymerizable with vinyl chloride are any of the above-exemplified vinyl monomers which are copolymerizable with vinyl chloride, and particularly include vinyl acetate, alkyl (meth)acrylate, especially $C_1$-$C_6$ alkyl (meth)acrylate, and the like. The deposit suppressant composition of the invention is also applicable to graft-copolymerization process wherein vinyl chloride is graft-copolymerized to an ethylene-vinyl acetate copolymer, ethylene-alkyl methacrylate copolymer, poly urethane and the like.

In the polymerization method of this invention, the polymerization initiator, the dispersing agent for use in combination with an aqueous medium, etc. may all be well-known conventional reagents, and there is no specific restriction on the polymerization temperature, time and other conditions.

For example, a suspension polymerization of a vinyl monomer can be carried out in a conventional manner in an aqueous medium such as water using a conventional dispersant (such as partially saponified polyvinyl acetate, carboxymethyl cellulose, gelatin, starch or like water-soluble macromolecular compounds) and, if desired, an auxiliary dispersion stabilizer (such as barium sulfate or the like) and using a conventional oil-soluble initiator such as benzoyl peroxide, lauroyl peroxide, 2,2'-azobisisobutyronitrile, di-2-ethylhexyl peroxydicarbonate or the like, at a temperature effective to effect the polymerization (usually about 20° to 80° C.) with stirring until the desired polymer is obtained.

Furthermore, the emulsion polymerization is also carried out in a conventional manner in an aqueous medium such as water using a conventional emulsifier (such as a salt of a sulfuric acid ester of a higher alcohol, alkylsulfonic acid salts or similar anionic surfactants or polyoxyethylene alkyl ethers or similar nonionic surfactants) and using conventional water-soluble initiators (such as hydrogen peroxide, potassium persulfate, ammonium persulfate or a redox catalyst) at a temperature of about 20° to 80° C., with stirring until the desired polymer is obtained.

The microsuspension polymerization can also be carried out in a conventional manner in an aqueous medium using a conventional emulsifier and an oil-soluble initiator such as one mentioned above. In this case, the reaction system is homogenized prior to the initiation of the polymerization. Then the polymerization is effected at a temperature of, for example, about 20° to 80° C. with stirring until the desired polymer is obtained. Such polymerization method is described, for example, in "Encyclopedia of PVC", 1976, edited by LEONARD I. NASS, MARCEL DEKKER, INC., New York, pages 88-89.

The foregoing polymerization methods per se are all well-known and conventional, and described in many publications such as "Encyclopedia of PVC" 1976, edited by LEONARD I. NASS, MARCEL DEKKER, INC., New York, pp. 76-89, U.S. Pat. No. 4,555,555 and the like, and the polymerization methods can be easily carried out by one skilled in the art.

The 8-hydroxyquinoline sulfide compound of the invention exhibits a very remarkable deposit suppressant effect when applied to the internal surfaces of a polymerization reactor for vinyl monomers. It is particularly suited for the polymerization of vinyl chloride monomers in an aqueous medium. When the reactor body, impeller blades and so on are made of stainless steel, the surfaces thereof are generally finished mirror-smooth by electrolytic polishing to prevent the deposit formation. The sulfide compounds of the invention adhere well to such surfaces and exhibit the deposit suppressant effect for a long period of time.

The following examples are intended to illustrate the invention in further detail and should by no means be construed to limit the scope of the invention.

EXAMPLE 1

A three-necked flask equipped with a reflux condenser and a stirrer was charged with 10 g (0.069 mole) of 8-hydroxyquinoline and 100 ml of toluene and heated with stirring to a temperature at which reflux of toluene took place. Then, 6.6 ml (0.082 mole) of sulfur monochloride was added dropwise at the same temperature as mentioned above over a period of 30 minutes and the reaction mixture thus obtained was maintained at the same temperature for one hour.

The reaction mixture was cooled to 25° C., so as to precipitate the reaction product.

The precipitated reaction product was isolated by a solid-liquid separation technique to give 14.8 g of 8-hydroxyquinoline sulfide as a solid.

The sulfide compound was a solid having a reddish brown color and was hygroscopic. The sulfide compound was insoluble in water and aliphatic hydrocarbons such as hexane, hardly soluble in tetrahydrofuran and soluble in lower alcohols, di($C_1$-$C_4$ alkyl) ketones and esters of $C_1$-$C_3$ fatty acids with $C_1$-$C_4$ alcohols.

The obtained sulfide compound was dissolved in methanol to give a deposit suppressant solution containing the sulfide compound in an amount of 0.1 g per 100 ml of the solvent.

EXAMPLE 2

The electrolytically polished internal wall and other parts of a stainless steel polymerization reactor of 100-liter capacity which were to be exposed to monomer charge were spray-coated with the deposit suppressant solution obtained in the same manner as in Example 1 in an amount of 0.1 g/m$^2$ calculated as solids to form a coating film.

After the atmosphere was purged, the polymerization reactor was charged with 40 kg of deionized water, 25 kg of vinyl chloride, 150 g of sodium lauryl sulfate, 100 g of stearyl alcohol and 4.0 g of di-2-ethylhexyl peroxydicarbonate.

After homogenization, the charge was heated to 53° C. to initiate polymerization. When the pressure had fallen by 0.5 kg/cm$^2$, unreacted monomer was removed to terminate the reaction. Then the liquid contents of the reactor were withdrawn.

After gently rinsing the internal surfaces of the polymerization reactor with water, the deposits were scraped off from the internal surfaces, and the amount of the deposits was measured. The amount of the deposits was 67 g/m$^2$.

COMPARISON EXAMPLE 1

Polymerization of vinyl chloride was carried out in the same manner as in Example 2 except that the internal surfaces of the reactor were not coated with the deposit suppressant solution.

The amount of the deposits on the internal surfaces was 1,200 g/m$^2$.

We claim:

1. A method of polymerizing a vinyl monomer wherein the vinyl monomer is polymerized using a deposit suppressant composition to prevent the formation of deposit on the internal surfaces of a polymerization reactor, which comprises applying to the internal surfaces of the polymerization reactor prior to polymerization a deposit suppressant composition comprising an 8-hydroxyquinoline sulfide compound.

2. A method according to claim 1 wherein the 8-hydroxyquinoline sulfide compound is a reaction product of 8-hydroxyquinoline and a member selected from the group consisting of a sulfur chloride and sulfur.

3. A method according to claim 1 wherein the 8-hydroxyquinoline sulfide compound is a reaction product of 8-hydroxyquinoline and a sulfur chloride.

4. A method according to claim 1 wherein the 8-hydroxyquinoline sulfide compound is a reaction product of 8-hydroxyquinoline and sulfur.

5. A method according to claim 1 wherein the vinyl monomer is vinyl chloride or a monomer mixture containing vinyl chloride as a major component and one or more vinyl monomers copolymerizable therewith as a minor component.

6. A method according to claim 1 wherein the deposit suppressant composition is in the form of a solution of the 8-hydroxyquinoline sulfide compound in a solvent, wherein the solvent is at least one organic solvent selected from the group consisting of $C_1$-$C_4$ saturated aliphatic alcohols, di($C_1$-$C_4$ alkyl) ketones esters of $C_1$-$C_3$ fatty acids with $C_1$-$C_4$ saturated aliphatic alcohols, or wherein the solvent is an aqueous alkali solution.

7. A method according to claim 6 wherein the deposit suppressant composition contains the 8-hydroxyquinoline sulfide compound in an amount of about 0.001˚ to 50 g per 100 ml of the solvent.

8. A method according to claim 1 wherein the deposit suppressant composition is applied to the internal surfaces of the polymerization reactor in an amount of about 0.01˚ to 10 $g/m^2$ calculated as solids.

9. A method according to claim 3 wherein the sulfur chloride is sulfur monochloride or sulfur dichloride.

10. A method according to claim 3 wherein the sulfur chloride is reacted with the 8-hydroxyquinone in an amount of about 0.5 to 2 moles per mole of 8-hydroxyquinone.

11. A method according to claim 3 wherein the sulfur chloride is reacted with the 8-hydroxyquinone in an amount of about 0.9 to 1.2 moles per mole of 8-hydroxyquinone.

12. A method according to claim 6 wherein the solvent is at least one organic solvent selected from the group consisting of methanol, ethanol, acetone, methyl ethyl ketone, methyl isobutyl ketone, ethyl acetate, an aqueous solution of NaOH and an aqueous solution of KOH.

13. A method according to claim 6 wherein the deposit suppressant composition contains the 8-hydroxyquinone sulfide compound in an amount of about 0.05 to 5 g per 100 ml of the solvent.

14. A method according to claim 5 wherein the vinyl monomer is a mixture containing vinyl chloride in an amount of at least 50 wt %.

15. A method according to claim 5 wherein the vinyl monomer is a mixture containing vinyl chloride in an amount of more than 80 wt % but less than 100 wt %.

16. A method of polymerizing a vinyl monomer wherein the vinyl monomer is polymerized using a deposit suppressant composition to prevent the formation of deposit on the internal surfaces of a polymerization reactor, which comprises applying to the internal surfaces of the polymerization reactor prior to polymerization a deposit suppressant composition comprising an 8-hydroxyquinone sulfide compound, wherein the 8-hydroxyquinone sulfide compound is a reaction product of 8-hydroxyquinone and a member selected from the group consisting of a sulfur chloride and sulfur;

wherein the vinyl monomer is vinyl chloride or a monomer mixture containing vinyl chloride as a major component;

wherein the deposit suppressant composition contains the 8-hydroxyquinone sulfide compound in an amount of about 0.001 to 50 g per 100 ml of the solvent;

and wherein the deposit suppressant composition is applied to the internal surfaces of the polymerization reactor in an amount of about 0.01 to 10 $g/m^2$ calculated as solids.

17. A method according to claim 16 wherein the sulfur chloride is sulfur monochloride or sulfur dichloride.

18. A method according to claim 16 wherein the sulfur chloride is reacted with the 8-hydroxyquinone in an amount of about 0.5 to 2 moles per mol of 8-hydroxyquinone.

19. A method according to claim 16 wherein the sulfur chloride is reacted with the 8-hydroxyquinone in an amount of about 0.9 to 1.2 moles per mol of 8-hydroxyquinone.

20. A method according to claim 16 wherein the solvent is at least one organic solvent selected from the group consisting of methanol, ethanol, acetone, methyl ethyl ketone, methyl isobutyl ketone, ethyl acetate, an aqueous solution of NaOH and an aqueous solution of KOH.

* * * * *